Dec. 30, 1969    LE ROY T. CUSHMAN ET AL    3,487,313
FREQUENCY GENERATING AND MEASURING APPARATUS
Filed Feb. 28, 1966    3 Sheets-Sheet 3
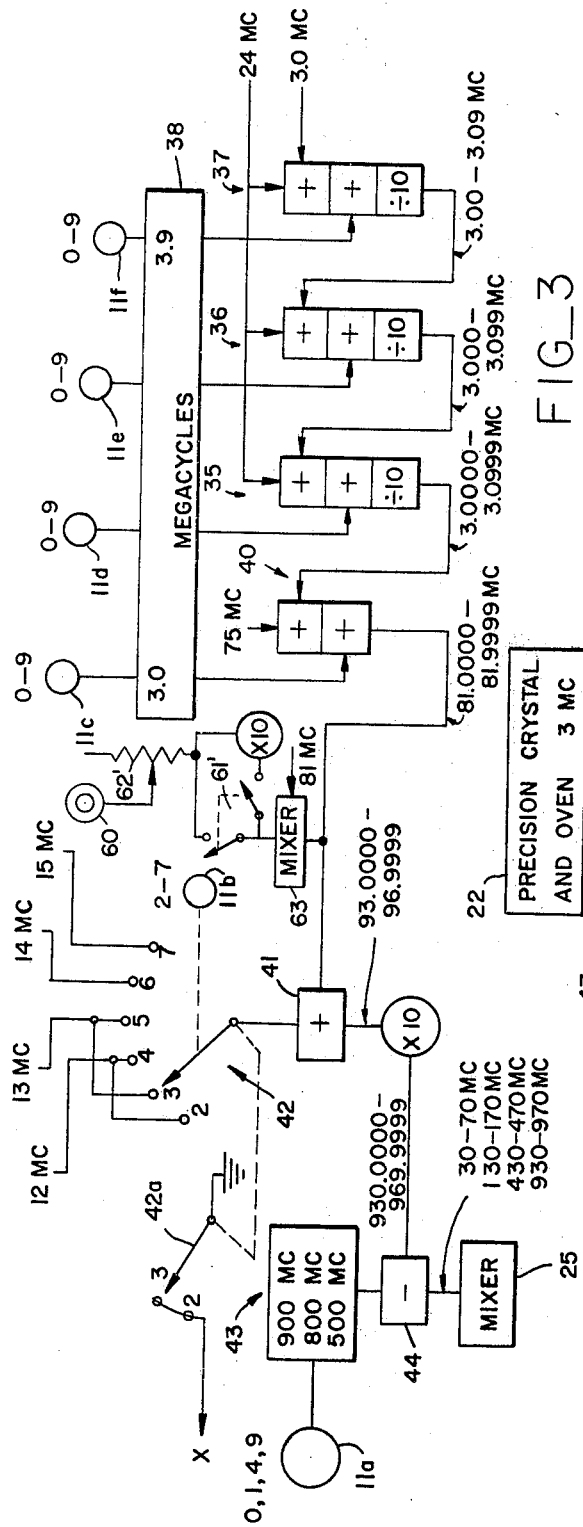
FIG_3
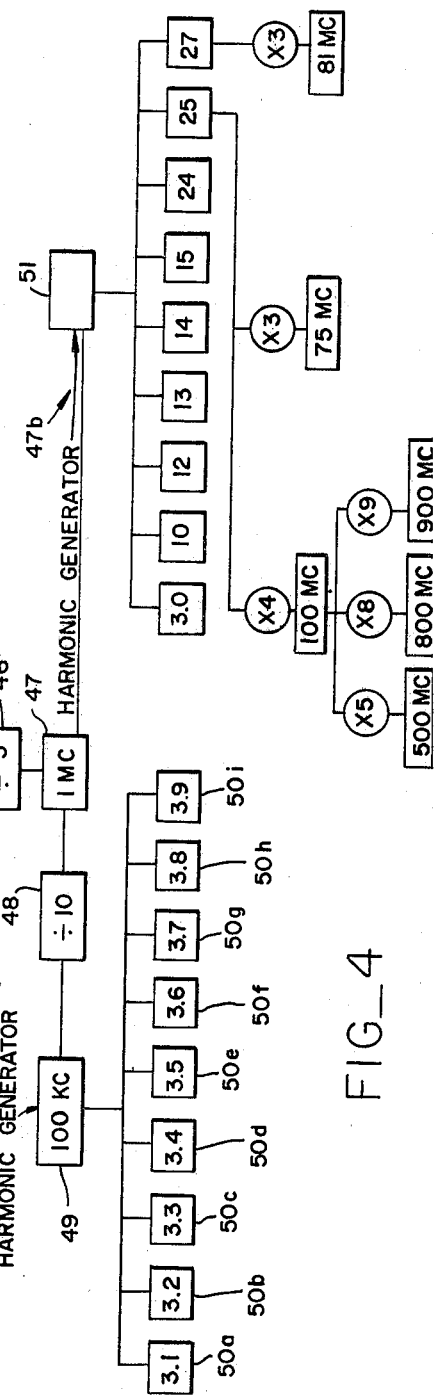
FIG_4
INVENTORS
Le Roy T. Cushman
Joseph C. Wu
Robert F. Welte
ATTORNEYS

United States Patent Office 3,487,313
Patented Dec. 30, 1969

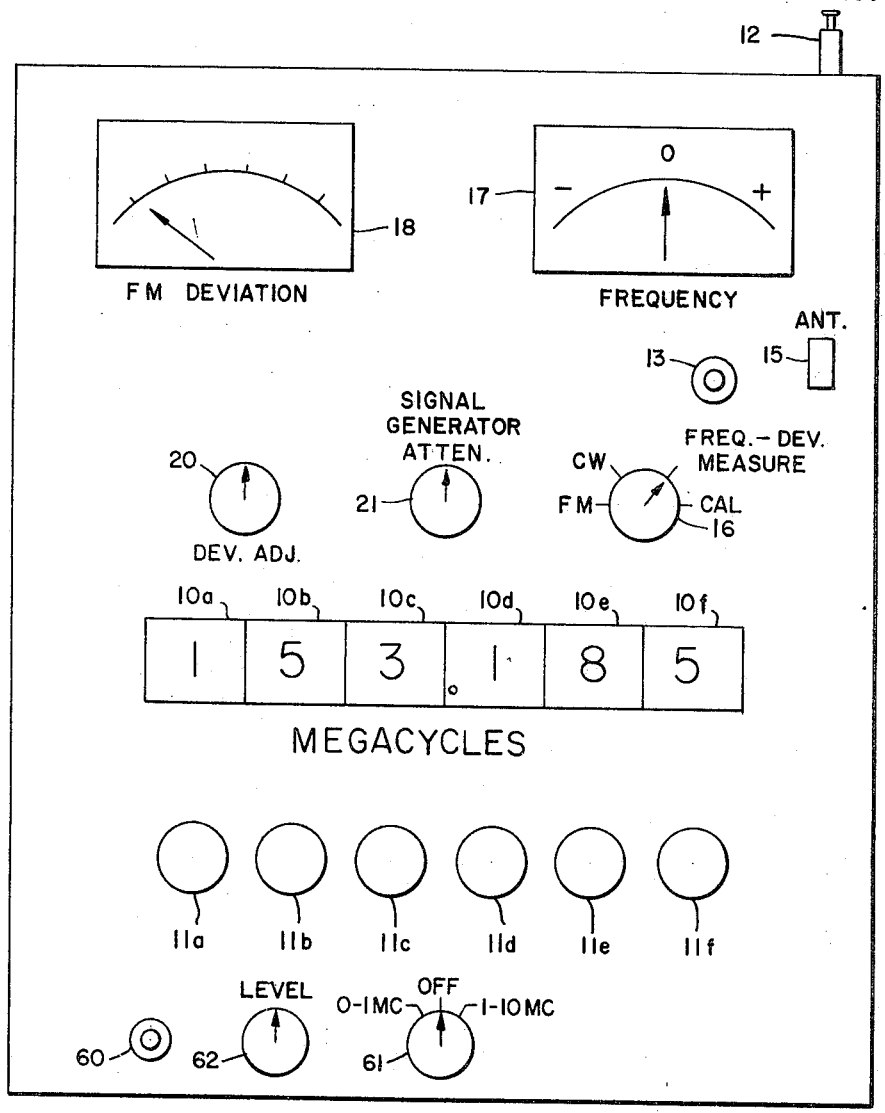
FIG_1

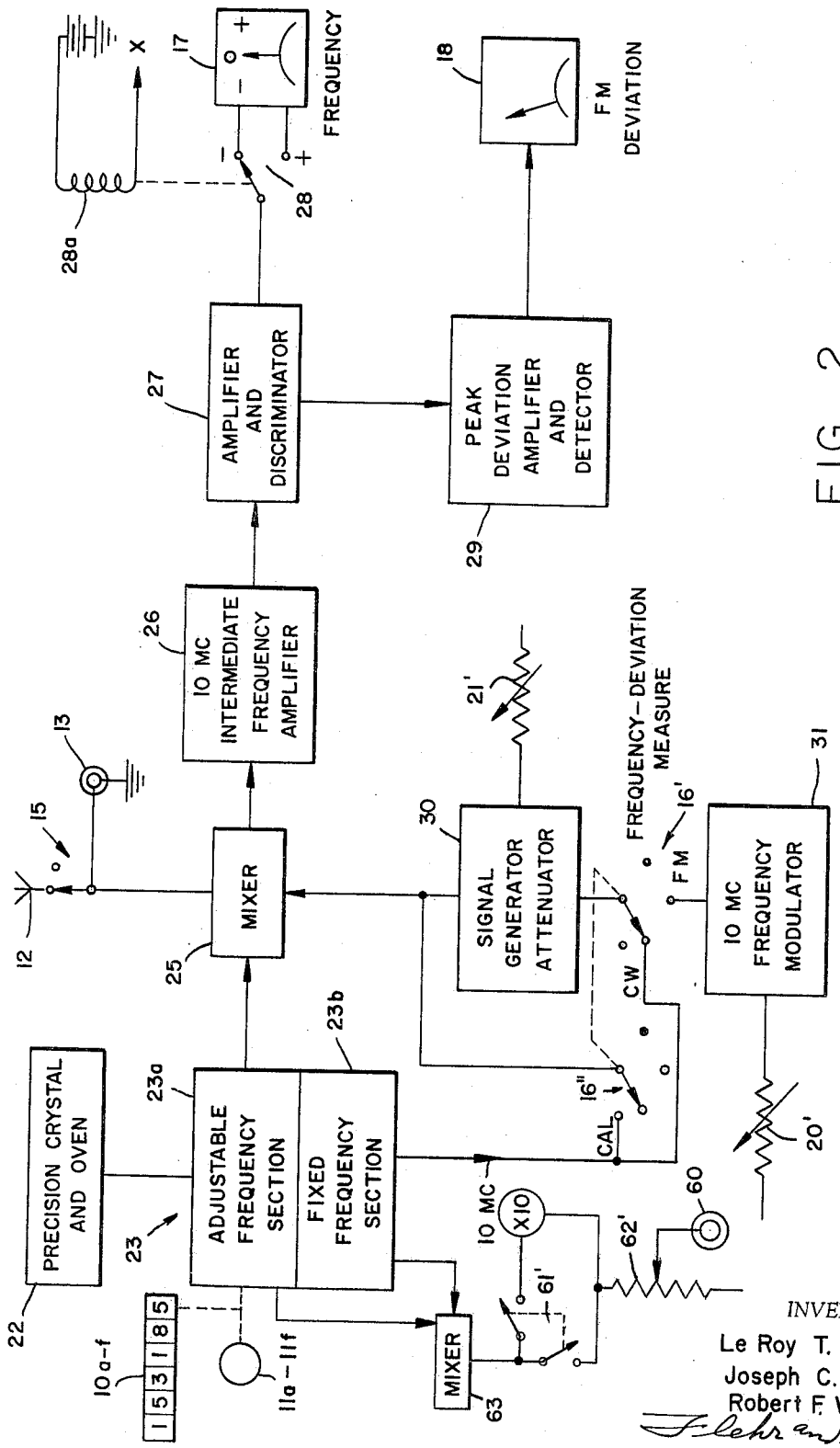
FIG_2

3,487,313
FREQUENCY GENERATING AND MEASURING APPARATUS
Le Roy T. Cushman, Los Gatos, Joseph C. Wu, Palo Alto, and Robert F. Welte, Cupertino, Calif., assignors to Cushman Electronics, Inc., Sunnyvale, Calif., a corporation of California
Filed Feb. 28, 1966, Ser. No. 530,723
Int. Cl. H04b 1/04
U.S. Cl. 325—134      1 Claim

ABSTRACT OF THE DISCLOSURE

A communications monitor for monitoring a selected frequency channel within any one of a plurality of frequency bands and indicating the frequency error of the signal of a radio transmitter which is nominally operating on such channel. Digital selecting means cooperating with a digital readout device are set to the nominal operating frequency to generate internally in the monitor a particular frequency differing from the monitored frequency channel by a predetermined intermediate frequency. The monitored frequency is mixed with this particular internal frequency and the resulting intermediate frequency is coupled to a frequency error meter which has previously been zeroed in on the proper intermediate frequency which assumed no error between a monitored signal and the value set on the digital readout device. The several frequency bands have identical bandwidths. The frequency bands of the internally generated frequency signals also are identical to each other but smaller than the monitoring bandwidth. This is accomplished by providing a frequency error meter with switch means for reversing the phase of the meter when the intermediate frequency fed to the meter is of a predetermined polarity. More specifically, a different polarity would be produced when the monitored frequency is above the internally generated frequency as compared to when it is below.

---

The present invention is directed to a frequency generating and measuring apparatus and more specifically to a device for monitoring any frequency within the normal frequency modulation communications spectrum.

Communications monitors must normally perform many complex functions with high accuracy. For example, the Federal Communications Commission requires that the users of two-way communications systems measure their transmitter frequency and frequency deviation periodically, and furthermore requires that these fall within a predetermined limit. There has long been a need for a communications monitor which will perform the above measurements with high accuracy and which will provide monitoring over all of the normal FM communications spectrum. Moreover, there has been a need to meet the above requirements with a device which is relatively simple and inexpensive, but yet is not unduly restricted in its functions, such as the number of channels available. Lastly, since a communications monitor may be utilized under non-laboratory conditions, it should be extremely simple in operation.

Accordingly, it is an object of the present invention to provide an improved frequency generating and measuring apparatus.

Another object of the invention is to provide a frequency generating and measuring apparatus where the specific frequency to be monitored can be easily selected by the operator.

Another object of the invention is to provide a frequency generating and measuring apparatus of the above character which is capable of measuring several predetermined frequency bands, and in a simple and economical manner.

Additional objects and features of the invention will appear from the following description in which the preferred embodiment is set forth in detail in conjunction with the accompanying drawings.

Referring to the drawings:

FIGURE 1 is a simplified view of the control panel of the frequency generating and measuring apparatus embodying the present invention;

FIGURE 2 is a block diagram of the apparatus of the present invention;

FIGURE 3 is a block diagram of a portion of FIGURE 2 showing a portion of the apparatus for frequency generation; and FIGURE 4 is a block diagram of another portion of FIGURE 2 illustrating another portion of the frequency generating apparatus.

Referring first to FIGURE 1, the control panel on the communications monitor demonstrates its many capabilities and its method of operation. Broadly speaking, the device monitors a frequency selected by the user which is indicated visually on digital readout means 10, the particular frequency there indicated being 153.185 megacycles. The readout means consists of six horizontally aligned digital readout devices which provide a readout of six digits. These individual devices 10a–10f indicate any one of several digits. A frequency is manually selected by a plurality of corresponding control knobs 11a–11f, each knob controlling a corresponding digital readout device to which it is physically coupled and juxtaposed. At the same time, the control knobs are coupled to signal generating means, in a manner to be explained later, to cause the communications monitor to generate a particular frequency.

From a functional point of view, the frequency being monitored may be fed into the device either by means of an antenna 12 or a coaxial radio frequency input device 13. A switch 15 couples antenna 12 to the device. With a control knob 16 placed in the Frequency-Deviation Measurement position, a frequency meter 17 will then indicate whether the monitored frequency is equal to or above or below the selected frequency, as indicated on readout device 10; if it is equal to the selected frequency, the meter will indicate zero; if it is below the selected frequency, it will indicate in the positive range of the meter scale. Thus, the operator is informed whether the frequency being monitored, which is normally from his own transmitter, is within the requirements of the Federal Communications Commission. Concurrently, the FM frequency deviation of the incoming signal is indicated by an FM deviation meter 18.

The communications monitor also has the capability of serving as a generator of either continuous wave or FM signals. This is accomplished, in the case of the generation of FM signals, by placing control knob 16 in its FM position. The frequency of such signal is then controlled by knobs 11a–11f, the generated frequency being indicated by readout device 10. The amount of deviation of the FM signal is adjusted by a control knob 20, and this deviation is indicated on meter 18. Lastly, the magnitude of the output signal is controlled by signal generator attenuator control knob 21. The output signal may be coupled to either the coaxial output terminal 13 or the antenna 12.

Similarly, when a CW or continuous wave signal is desired to be generated, control knob 16 is turned to the CW position. The desired CW frequency is obtained by means of adjustment of control knobs 11a–11f.

Generation of frequencies in the audio and in the intermediate frequency range of many transmitter-receivers to be tested is also provided by a coaxial output 60. A control knob 61 may be adjusted to the 0–1 megacycle per second range or the 1–10 megacycle per second range. Control knobs 11c–11f may then be adjusted in increments of 100 cycles per second to produce a frequency within the 0–1 megacycle range or 1000 cycle per second increments in the case of the 1–10 megacycle range, as will be explained below in greater detail. Knob 62 controls the level of the output signal on output 60.

The functions as described in relation to the control panel of FIGURE 1 will be more completely understood by use of the block diagram of FIGURE 2. In that figure, all of the control knobs and meters of FIGURE 1 are indicated by the corresponding reference numerals.

The basic frequency source of the present communications monitor of the present invention is a precision crystal and oven 22 which produces a 3 megacycle signal and is coupled to a six digit frequency selector 23. Control knobs 11a–11f are coupled to the selector 23, as indicated, to produce a desired output frequency signal which is fed to a mixer 25. Frequency selector 23 includes an adjustable frequency section 23a and a fixed frequency section 23b, both of which will be discussed in greater detail with reference to FIGURES 3 and 4, respectively.

In effect, the frequency selector acts as a local oscillator for a mixer 25 which is coupled to RF connector 13 and through switch 15 to antenna 12. The normal intermediate frequency output of the mixer, which in the case of the present invention is 10 megacycles, is coupled to an intermediate frequency amplifier 26 which, in turn, is connected to an amplifier and discriminator 27. The discriminator output operates the frequency meter 17 which as discussed previously indicates whether the monitored frequency is equal to, above, or below the frequency selected in frequency selector 23. The meter itself is coupled to the discriminator through a reversing switch 28 which is actuated by a relay 28a. The output of the discriminator 27 also supplies a peak deviation amplifier and detector 29 which is coupled to FM deviation meter 18 to indicate the FM frequency deviation of the monitored signal.

In operation, frequency meter 17 will read zero variance when the monitored signal differs from the selected frequency of the six digit frequency selector 23 by the normal intermediate frequency, such as typically 10 megacycles. Thus, the frequency meter 17 must be zeroed in at the intermediate frequency value. Toward accomplishing this end, the 10 megacycle intermediate frequency used in this embodiment is fed from the fixed frequency section 23b to mixer 25 through a switch 16″. Switch 16″ is in the proper position for this operation when the switch arm is contacting the Calibrate (CAL.) terminal which is connected to the fixed frequency section. Both switch 16″ and switch 16′ to which it is ganged are controlled by knob 16.

In addition to the calibration function, a CW signal may also be produced on either antenna 12 or signal terminal 13 by moving switch 16′ to the CW position, thus mixing the intermediate frequency signal with the output of frequency selector device 23. Similarly, a frequency generation function is accomplished with switch 16′ in its FM position which couples a frequency modulation generator 31 having a 10 megacycle carrier to mixer 25. The magnitudes of both the CW type signal and the FM signal are controlled by means of attenuator 30 which, in turn, is controlled by control device 21′. Also, the amount of frequency modulation of the FM signal generator 31 is determined by control device 20′. Both of these control devices have corresponding manual control knobs 20 and 21, as shown in FIGURE 1. A copending patent application Ser. No. 529,827, filed Feb. 24, 1966, entitled "FM Communications Test Apparatus" discusses the FM generator and its use with the communications monitor in greater detail.

When it is desired to monitor an incoming signal, both the continuous wave (CW) signal source and the frequency modulation generator 31 are disconnected from mixer 25 by rotating switch 16′ to the Frequency-Deviation Measure terminal which is floating.

An IF and audio output terminal 60 is provided, as discussed above, which is coupled through a potentiometer 62′ (level control knob 62) and a mixer 63 to the frequency selector 23. Ganged switches 61′ (associated with control knob 61) provide for the 0–1 megacycle range by closure of the contacts between the mixer and output 60, and the 1–10 megacycle range by closure of contacts of switch 61′ between the mixer and a times ten multiplier which is coupled to output 60.

The six digit frequency selector 23 is capable of producing a frequency within four selected bands. This is accomplished by means of the concept of frequency synthesization to an accuracy of more than 0.0001%. The details of this frequency synthesizer is one which forms a series of arithmetic operations on a signal from a frequency standard which, in the present case, is precision crystal 22, as illustrated in FIGURE 2. The concept of frequency synthesization is well known in the art as, for example, illustrated by Patent No. 3,119,078 to R. R. Stone, Jr., entitled "Coordinate System Frequency Synthesizer."

FIGURE 3 illustrates the adjustable frequency section 23a of the synthesizer or frequency selector, and FIGURE 4 the fixed frequency section 23b which provides all of the fixed frequencies for the adjustable frequency section.

Referring now specifically to FIGURE 3, control knobs 11a–11f are illustrated coupled to certain components of the adjustable frequency section. Above the knobs is indicated the range of digits to which the frequency section may be adjusted and which are concurrently read out on readout meter 10. The following table indicates the actual frequency coverage of the communications monitor of the present invention:

20–80 megacycles
120–180 megacycles
420–480 megacycles
920–980 megacycles

Thus, the hundreds of megacycles place of the readout 10, as indicated in FIGURE 1 and controlled by control 11a, may be adjusted for the digits 0, 1, 4, and 9; the tens of megacycles place is controlled by knob 11b and may be adjusted to the digits 2–7 since each frequency band has a bandwidth of 60 megacycles from 20 to 80 megacycles; the remaining four knobs 11c–11f are adjustable from 0 through 9.

From the above table, it is apparent that the bandwidth of each frequency band is 60 megacycles. The selection of identical bandwidths for each frequency band allows the construction of a frequency synthesizer in a very simple and relatively economical manner. Without such equal frequency bandwidths it would be necessary to have much duplication of components, thereby causing an attendant cost increase in the device.

As indicated in FIGURE 3, the frequency synthesizer includes three identical mixer-divider units 35, 36, and 37; the mixers are identified by plus signs and the divider units by the divide by 10 indication. In describing the frequency synthesizer the actual frequencies utilized in the invention will be indicated, but it should be emphasized that other frequencies may be used with equal success. In the first mixer-divider unit 37, a 24 megacycle carrier signal is mixed with a 3 megacycle signal to produce 27 megacycles which, in turn, in the second mixer unit is added to a frequency of from 3.0 to 3.9 megacycles in 100 kilocycle increments which are derived from a switching unit 38 coupled to control knobs 11c–11f. Thus, a setting of knob 11f, which is associated with mixer unit 37, to the "3" position will cause a frequency of 3.3 megacycles to be placed into the second mixer. This will add to the 27 megacycles from the first mixer to yield 30.3 megacycles. When divided by 10, this becomes 3.03 megacycles; the entire range of output from mixer-divider unit 37 therefore extends from 3.00 to 3.09 megacycles as indicated on the drawing. Thus by the mixing-dividing operation a frequency is synthesized to great accuracy. Similar operations are carried on in mixer-divider units 35 and 36, in conjunction with control knobs 11d and 11e, respectively, to produce output frequencies with the indicated ranges.

Following mixer-divider unit 35 is a fourth unit 40 which mixes a 75 megacycle input from the fixed frequency section 23b with the output of mixer-divider 35, and in a second mixer this output is mixed with an input from switch 38 controlled by knob 11c to produce the indicated output frequency. The output of unit 40 is coupled to a mixer 41 whose input is controlled by knob 11b through a switch 42. This switch couples the fixed frequencies 12, 13, 14, and 15 megacycles from the fixed frequency section, illustrated in FIGURE 4, into the mixer 41 to provide the indicated frequency range. The contact terminals of switch 42 are designated from 2 through 7 to correspond to the 2 through 7 output readout of the digital readout device coupled to switch 11b. This range is, of course, restricted since the frequency synthesizer produces only four different frequency bands. Moreover, the 2 through 7 readout is indicative of the 60 megacycle bandwidth of each frequency band since switch 11b controls the tens of megacycles place of the frequency synthesizer. Terminals 2 and 4 of switch 42 are coupled and thence to a 12 megacycle fixed frequency source; terminals 3 and 5 are coupled together and to a 13 megacycle frequency source; terminal 6 is coupled to a 14 megacycle source; and terminal 7 is coupled to a 15 megacycle source. A switch 42 is ganged to an additional switch 42a which places a ground on a terminal designated "X" when the switch 42 is in positions 2 and 3. Terminal X is coupled to the X terminal of relay coil 28a, as illustrated in FIGURE 2, and thus when switch 42a places ground on X terminal, it will cause the relay 28a to actuate the reversing switch 28. This is important in the reduction of the frequency synthesizer bandwidth which will be discussed below.

Continuing to trace the functioning of the frequency synthesizer, the output of mixer 41 is multiplied by a factor of ten, and fed to the last unit 44 of the synthesizer. The mixer 44 operates in a minus mode by which the fixed frequencies of 900 megacycles, 800 megacycles and 500 megacycles are subtracted from the incoming frequency received from mixer 41 and the associated multiplier. These three frequencies are derived from the fixed frequency section of FIGURE 4 and are selectively switched by means of a switch 43 into mixer 44. Control knob 11a, which determines the hundred of megacycles digit of the output frequency, is coupled to the switch. When control 11a is turned to its "0" position, the 900 megacycle frequency is selected to produce the 30–70 megacycle range; in the "1" position, 800 megacycles is selected to provide the 130–170 megacycle range; in the "4" position, 500 megacycles produces 430–470 megacycles; and in the "9" position, the required range of 930–970 megacycles is already present. Thus, the output of mixer 44 which consists of four frequency bands each having a bandwidth of 40 megacycles, as indicated on the drawing, are then fed to the mixer 25, also illustrated in FIGURE 2.

IF and audio frequencies for output 60 are derived for output 60 by coupling mixer 63 to the output of mixer unit 40. An 81 megacycle fixed frequency is heterodyned with this output to produce the 0–1 megacycle range, and the times ten multiplier produces the 1–10 megacycle range.

FIGURE 4 discloses in detail the structure for generating all of the required fixed frequencies. The basic frequency standard is precision crystal 22 which produces a 3 megacycle output. This is divided by three by divider 46, and the 1 megacycle output is fed into a 1 megacycle filter 47 whose output is then split into two branches 47a and 47b. The 47a branch includes a divider 48 which produces a 100 kilocycle signal which is coupled to harmonic generator 49. The harmonic generator in particular produces a range of output frequencies in the 3.1 to 3.9 megacycle spectrum which are individually filtered out by filters 50a–50i which produce consecutively the frequencies 3.1–3.9 megacycles. In branch 47b, a harmonic generator 51 produces, in particular, frequencies from 3–27 megacycles. Separate filters are provided to yield the indicated frequencies. The output of the 25 megacycle filter is multiplied by 4 to produce 100 megacycles which, in turn, is multiplied by 5, 8, and 9, respectively, to generate the 500, 800, and 900 megacycle sources used in the final unit of the frequency synthesizer. Also, the 25 megacycle output is multiplied by 3 to produce a 75 megacycle source for unit 40. Additionally, the 27 megacycle output is multiplied by 3 to obtain 81 megacycles which is used in mixer 63 for the production of IF and audio frequencies.

From the preceding description, it is apparent that the bandwidth of the frequency bands being synthesized and fed into the mixer 25 is 40 megacycles per second as compared to the broader 60 megacycle per second bandwidth which the present invention is capable of monitoring. In order to obtain this 60 megacycle per second bandwidth, the present invention utilizes the principle that the local oscillator or frequency selector 23 may be operated on a frequency lower than the frequency channel being monitored, or higher than the frequency channel being monitored so long as the frequency difference or displacement produced by the heterodyne action of the mixer is an amount equal to the predetermined intermediate frequency. Thus, when the local oscillator of frequency selector is generating a particular frequency, as, for example, 933 megacycles, the selected frequency channel, which is to be measured, may be above this particular frequency by the amount of the intermediate frequency or 943 megacycles per second. This is also the frequency which will be indicated on the visual readout devices 10a–f, and in which knob 11b is turned to its "4" position. On the other hand, if 923 megacycles is the frequency channel to be monitored, the visual readout devices will be switched to indicate 923 megacycles per second, but internally the frequency synthesizer or local oscillator will still be generating the same frequency of 933 megacycles per second which it feeds into the mixer 25. The resultant intermediate frequency from the mixer in this case will be of an opposite phase as compared to the first intermediate frequency, and, as discussed above, provision has been made for reversing the phase of meter 17 by actuating the relay 28a. This is accomplished by the setting of the control knob 11b in the "2" position which rotates the switch 42a from an open position to a grounded position placing battery on the relay. The activation of relay 28a reverse the frequency error meter 17 so that it is again properly phased.

The invention also provides for the reduction of spurious frequencies by using, as shown in FIGURE 3, a final frequency at the output of the times ten multiplier of mixer 41 which is higher in value than any of the carrier frequencies 900, 800, and 500 megacycles which are coupled into mixer 44. This means that the undesired frequencies are far enough removed from the desired frequency so as to be of no problem. In addition, any harmonics are also far enough away, from a frequency standpoint, from the center frequency to avoid any interaction with the desired center frequency.

Thus, there is provided by the present invention a relatively inexpensive but accurate frequency generating and measuring apparatus which by the use of identical frequency bandwidths for the several frequency channels utilized and the reduction of the necessary frequency bandwidth for the frequency selector circuits as compared to the bandwidth of the monitored frequencies, allows the production of a device with relatively fewer and simpler components. For example, in the case of bandwidth it is well known that the larger the frequency bandwidth of an electronic device, the more expensive and complicated; and, at times, this is a non-linear type of relation, where a small increase in frequency bandwidth requires a relatively large expenditure. Similarly, the use of identical frequency bandwidths dispenses with the requirements of additional components. From an operational point of view, the arrangement of the visual readout devices and the control knobs 11 controlling the readout devices and the frequency synthesizer provides for rapidly setting into the communications monitor the frequency channel to be monitored.

We claim:

1. In a frequency generating and measuring apparatus for monitoring a selected frequency channel within any one of a first plurality of frequency bands, each of such bands having a first predetermined bandwidth which includes a plurality of frequency channels and said apparatus indicating the frequency error of the signal of a radio transmitter which is nominally operating on said channel, means for generating a signal of a particular frequency within a second plurality of frequency bands corresponding to said first bands each of said second bands having a second predetermined bandwidth smaller than said first bandwidth and a plurality of frequency channels, said particular frequency differing from said monitored frequency channel by a predetermined intermediate frequency, visual digital readout means coupled to said generating means for indicating the frequency of said monitored channel such means including a plurality of horizontally aligned digital readout devices, a plurality of selecting means coupled to said generating means and said readout means, actuation of said selecting means concurrently causing said generating means to generate said particular frequency and said readout means to indicate the frequency of the monitored channel, means for mixing said transmitted signal being monitored with said particular frequency signal to provide a difference frequency, and means receiving said difference frequency including a frequency error meter to indicate the frequency error between such difference frequency and said predetermined intermediate frequency signal whereby said frequency error of said transmitter is indicated such means also including switch means responsive to said selecting means for reversing the phase of said meter when the frequency of a monitored channel is outside of any said second plurality of frequency bands but within a corresponding one of first bands.

References Cited

UNITED STATES PATENTS

| | | | |
|---|---|---|---|
| 2,627,033 | 1/1953 | Jensen et al. | 324—79 |
| 2,705,281 | 3/1955 | Morris et al. | 325—134 X |
| 2,900,601 | 8/1959 | Corl et al. | 324—79 |
| 3,054,057 | 9/1962 | Bettin et al. | 325—383 |
| 3,102,980 | 9/1963 | Houck et al. | 324—78 X |
| 2,836,712 | 5/1958 | Crosby | 325—455 X |

OTHER REFERENCES

Wireless World, November 1961, pp. 589–594, "Radio Frequency Measurements."

ROBERT L. GRIFFIN, Primary Examiner

B. V. SAFOUREK, Assistant Examiner

U.S. Cl. X.R.

324—78, 79; 325—363